US008255272B2

(12) United States Patent
Petroczi

(10) Patent No.: US 8,255,272 B2
(45) Date of Patent: Aug. 28, 2012

(54) TEST METHOD FOR DETECTING DEVIATIONS OF GEOOBJECTS

(75) Inventor: Julius Petroczi, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 722 days.

(21) Appl. No.: 11/991,211

(22) PCT Filed: Aug. 1, 2006

(86) PCT No.: PCT/EP2006/064901
§ 371 (c)(1),
(2), (4) Date: Apr. 1, 2009

(87) PCT Pub. No.: WO2007/025826
PCT Pub. Date: Mar. 8, 2007

(65) Prior Publication Data
US 2009/0326994 A1 Dec. 31, 2009

(30) Foreign Application Priority Data
Aug. 30, 2005 (DE) ......................... 10 2005 041 068

(51) Int. Cl.
*G07B 15/00* (2011.01)
*G07B 15/02* (2011.01)
*H04W 24/00* (2009.01)

(52) U.S. Cl. ..... 705/13; 340/928; 455/404.1; 455/456.1

(58) Field of Classification Search .................... 705/13; 455/456.1, 404.1; 340/928
See application file for complete search history.

(56) References Cited

U.S. PATENT DOCUMENTS

| | | | | |
|---|---|---|---|---|
| 5,694,322 | A * | 12/1997 | Westerlage et al. | 705/417 |
| 5,717,389 | A * | 2/1998 | Mertens et al. | 340/928 |
| 5,933,114 | A * | 8/1999 | Eizenhofer et al. | 342/457 |
| 5,999,126 | A * | 12/1999 | Ito | 342/357.25 |
| 7,778,746 | B2 * | 8/2010 | McLeod et al. | 701/22 |
| 7,865,391 | B2 * | 1/2011 | Martinez-Olague et al. | 705/13 |
| 2003/0158799 | A1 * | 8/2003 | Kakihara et al. | 705/30 |
| 2004/0153401 | A1 * | 8/2004 | Gila et al. | 705/39 |
| 2004/0260462 | A1 * | 12/2004 | Quartier | 701/207 |
| 2005/0097018 | A1 * | 5/2005 | Takida | 705/35 |
| 2005/0216187 | A1 * | 9/2005 | Hartinger | 701/207 |
| 2005/0258978 | A1 * | 11/2005 | Hartinger | 340/928 |
| 2006/0009152 | A1 * | 1/2006 | Millard et al. | 455/12.1 |

(Continued)

FOREIGN PATENT DOCUMENTS

DE 43 44 433 A1 7/1995

(Continued)

*Primary Examiner* — John Hayes
*Assistant Examiner* — Brian Epstein

(57) ABSTRACT

Test method for optimizing the collection of tolls from vehicles on toll roads of a road network, which is carried out by a vehicle-mounted position-determining unit and a vehicle-external management unit which has a data connection to the latter, the toll roads of the road network having detection zones superimposed on them in an electronic image of the road network and the vehicle-mounted position-determining unit transmitting toll-related data to the management unit when vehicle positions are determined within the detection range. There is provision for monitoring zones to be additionally provided in the electronic image of the road network, which monitoring zones are assigned to detection zones and in their spatial extent extend in each case beyond the detection zone assigned to them, the position-determining unit transmitting the position data, located within the monitoring zone, of the vehicle to the management unit when vehicle positions are determined within the monitoring zone and outside the detection zone.

16 Claims, 1 Drawing Sheet

U.S. PATENT DOCUMENTS

| | | | | |
|---|---|---|---|---|
| 2006/0079248 | A1 * | 4/2006 | Otsuka et al. | 455/456.1 |
| 2006/0258367 | A1 * | 11/2006 | Chiang | 455/456.1 |
| 2007/0167145 | A1 * | 7/2007 | Bonnenfant | 455/404.1 |
| 2007/0275731 | A1 * | 11/2007 | Alfert et al. | 455/456.1 |

FOREIGN PATENT DOCUMENTS

| | | | |
|---|---|---|---|
| DE | 4344433 | A1 | 7/1995 |
| DE | 44 02 614 | A1 | 8/1995 |
| DE | 4402614 | A1 | 8/1995 |
| DE | 199 49 622 | A1 | 5/2001 |
| DE | 19949622 | A1 | 5/2001 |
| DE | 102 05 453 | A1 | 8/2003 |
| DE | 10205453 | A1 | 8/2003 |
| EP | 1 120 749 | A1 | 8/2001 |
| EP | 1120749 | A1 | 8/2001 |
| GB | 2406425 | * | 3/2005 |
| RU | 2136047 | C1 | 5/1995 |
| RU | 2136047 | C1 | 8/1999 |
| RU | 2298228 | C2 | 4/2007 |
| RU | 2004100315 | A | 4/2007 |
| WO | 9520748 | A1 | 8/1995 |
| WO | WO 95/20801 | A1 | 8/1995 |
| WO | WO 9520748 | A1 | 8/1995 |
| WO | WO 9520801 | A1 | 8/1995 |
| WO | WO 03042926 | A1 | 5/2003 |
| WO | WO 2004/025574 | A1 | 3/2004 |
| WO | WO 2004025574 | A1 | 3/2004 |
| WO | WO2007/073748 | * | 5/2007 |

* cited by examiner

TEST METHOD FOR DETECTING DEVIATIONS OF GEOOBJECTS

CROSS REFERENCE TO RELATED APPLICATIONS

This application is the US National Stage of International Application No. PCT/EP2006/064901, filed Aug. 1, 2006, and claims the benefit thereof. The International Application claims the benefits of German application No. 10 2005 041 068.5 DE filed Aug. 30, 2005, both of the applications are incorporated by reference herein in their entirety.

FIELD OF INVENTION

The invention relates to a method for optimizing the detection of vehicles liable to pay tolls on toll roads of a road network, comprising a vehicle-mounted position determining unit and, connected to the latter for purposes of data communication, a vehicle-external management unit, wherein the toll roads of the road network are overlaid in an electronic image of the road network by detection zones, and the vehicle-mounted position determining unit, upon determining vehicle positions within the detection zone, determines toll-related data on the basis of the position data lying within the detection zone and sends said toll-related data to the management unit.

BACKGROUND OF INVENTION

Several solutions for implementing a toll collecting system have been proposed in the prior art. Thus, for example, systems were proposed wherein a toll card can be purchased at monitoring stations located at state, region or zone boundaries, said card entitling the purchaser to use the desired road section. The toll card is usually taken from a machine at an entry station of a particular tolled road section, and the toll fee, which is calculated by way of a respective calculation key, is paid at an exit station by the vehicle driver either in cash or by means of a credit card.

Similarly, a separate monitoring station with its own entry lane can be provided for commuters or vehicle drivers who frequently use a particular stretch of road, the vehicle being identified at said monitoring station by way of optoelectronic license plate recognition, and the vehicle driver, assuming a corresponding entry is present in a user database, being allowed to pass at a toll barrier. The toll charge due is either paid as a lump sum or debited in several installments over a year from the toll user's account.

Also possible is a localization of the vehicles of toll users via toll portals or monitoring units which are based on microwave communication. An electronic toll system of this type has been realized in Austria, for example, in order to enable vehicles having a total weight of 3.5 tonnes or more to be tolled automatically. For this purpose toll portals are erected on all tollable road sections of the national trunk road network, which is to say, in the case of Austria, motorways and expressways, which toll portals are equipped with microwave antennas and communicate with the mobile detection units which are installed in the vehicles and which every vehicle liable to pay tolls must carry.

However, flexibly regulated toll collecting methods are becoming increasingly important not just for private passenger vehicle traffic, but more particularly also for truck traffic. For this purpose a mobile detection unit known as an "on-board unit" and referred to in the following as a position determining unit is being used throughout Europe. Said unit is a device which is installed in the truck or vehicle in order to allow automatic billing of toll charges in a charge collection or toll system. German, French, Italian and Spanish motorway operators, but also increasingly other countries inside and outside Europe, are turning to position determining units of this type in order to register toll charges.

In systems of this kind an electronic mobile detection unit is assigned to a specific vehicle. A detection unit of this kind is about the size of a car radio and can usually be installed in the standardized receiving slot for car radios or mounted on the dashboard of the driver compartment. The sections of tolled roads that have actually been used by the toll user and attract a charge can be ascertained by means of different navigation systems which operate in cooperation with the detection unit. The use of satellite positioning systems, for example, is common, the GPS ("Global Positioning System") system operated by the United States Department of Defense currently experiencing the most widespread use among navigation applications. By means of GPS or an equivalent positioning system, the position of a receiver can be determined worldwide at any time with a spatial resolution of less than 10 m. By providing certain add-on modules such as, say, DGPS ("Differential Global Positioning System"), in which correction data for a mobile receiver is calculated with the aid of the position data of a stationary base receiver, it is even possible to pinpoint the position of a vehicle exactly with a spatial resolution of less than 1 m.

In this case individually tailored software components ensure an appropriate linking of the received geographical position data of the respective vehicle of the toll user with stored information relating to tolled road sections in the form of electronic images of the entire road network, and determine the sum total of the collected toll values, which are transmitted for billing purposes at periodic intervals. Time data, i.e. periods of time which the vehicle spends in a particular toll zone, can of course also be taken into account in toll calculation algorithms.

In reality, this can be effected for example by overlaying the electronic image of roads that are subject to tolls within a road network with detection zones. In this case said zones are geometric figures such as, say, circles, tubular areas or closed polylines (n corners) which are defined by means of geographical position data and supplementary data such as, say, the diameter in the case of a circular detection zone. During the journey of a tollable vehicle, the position determining unit disposed in said vehicle constantly determines the position data of the vehicle. Said position data is transferred into the electronic image of the road network and compared with the detection zones. If the vehicle enters a detection zone during its journey, the position data lying within the detection zone is stored until the vehicle leaves the detection zone again. The position data within the detection zone can subsequently be used as a basis for calculating the total number of kilometers traveled in the tollable zone, and said total used, possibly in conjunction with vehicle-related data such as, say, total weight, or road-section-related data such as, say, different toll levels, for calculating the toll.

When the toll system is configured, effort is naturally focused on detecting tollable journeys as accurately as possible. For this reason the detection zones are chosen as small as possible in order to avoid incorrectly detecting vehicles which, although moving in very close physical proximity to tollable zones, are not actually traveling on tollable roads. In this case the detection zones should record the road-section-related course of tollable roads as accurately as possible. However, the lower limit for the size of the detection zones is set by the spatial resolution of the position determination means of a vehicle, as well as by deviations of the electronic image of the road network from the real state of affairs. Furthermore, the accuracy of the transfer of the vehicle position into the electronic image of the road network is also subject to limits due to other factors which often can only be recognized as a result of practical experience. In spite of careful specification of a detection zone it can therefore happen during practical operation of the toll system that a vehicle travels on a tollable road without being detected by the toll system, since the corresponding detection zone is not optimally specified. However, whether a detection zone is optimally specified can again often only be ascertained during practical operation, and moreover by those journeys which have actually passed through a detection zone, but have not been detected due to suboptimal choice of the detection zone. However, it is precisely these journeys which are not detected by a toll system according to the prior art. Owing to the large volumes of data, however, it is not feasible to carry out a retrospective check of all journeys based on a comparison of the position data with the detection zones.

DE 4344433 describes "entry and exit coordinate vectors" with which the location coordinates of the vehicle are correlated. However, if said "entry and exit coordinate vectors" are wrongly adjusted, and consequently vehicles constantly fail to be detected despite being in the tollable area, or vehicles are incorrectly detected even though they are outside the toll area, there is no means of making a retrospective adjustment.

In WO 95/20801 reference is made to "collecting points" at which vehicles are detected. Given "agreement" of the vehicle position with the position of a collecting point the passing of the vehicle is detected. However, there is no means of constantly checking the positioning of the collecting points, which are defined by "predetermined geographical positions", and making possible corrections that are necessary. If, for example, a collecting point is wrongly chosen, or systematic measurement errors in the position determination of the vehicle occur in this area, deficiencies in the collecting of the toll levy constantly take place which, according to WO 95/20801, cannot be detected.

SUMMARY OF INVENTION

It is therefore an object of the invention to solve this problem and thereby optimize the detecting of tollable vehicles. In this case it is intended in particular to provide a test method by means of which non-detected journeys also are subjected to a retrospective check, but without substantially increasing the volume of data in the process.

There is described a method for optimizing the detecting of tollable vehicles on tolled roads of a road network in an independent claim. There is provided a vehicle-mounted position determining unit and, connected to the latter for purposes of data communication, a vehicle-external management unit, wherein the toll roads of the road network are overlaid in an electronic image of the road network by detection zones, and the vehicle-mounted position determining unit, upon determining vehicle positions within the detection zone, determines toll-related data on the basis of the position data lying within the detection zone and sends said toll-related data to the management unit. According to the invention it is now provided that monitoring zones are additionally provided in the electronic image of the road network, which monitoring zones are assigned to detection zones and in their spatial extension in each case extend beyond the detection zone assigned to them, the position determining unit, upon determining journeys exclusively within the monitoring zone and outside the detection zone, sending the position data of said journeys lying within the monitoring zone to the management unit, and the management unit performing a retrospective check of said position data, as well as possibly adjusting the detection zone in the electronic image of the road network.

The solution according to the invention thus represents a compromise between enlarging the detection zones, which would lead to an increased imprecision of the toll system, and a checking of all journeys, which would lead to enormous volumes of data. The additional monitoring zones initially cause no noticeable increase in data volumes, since journeys which have been detected anyway by the particular specification of a detection zone are billed and processed in the customary way. Only in those cases in which the position determining unit determines vehicle positions within the monitoring zone, but outside the detection zone, is the position data of the vehicle lying within the monitoring zone sent to the management unit for retrospective checking.

In order to reduce the data further it can be provided that the position determining unit, upon determining vehicle positions within the monitoring zone as well as within the detection zone, deletes the vehicle position data lying within the monitoring zone and outside the detection zone. That position data which lies within the detection zone and therefore also within the monitoring zone is used in the known manner for determining the toll charge. In these cases there is therefore no additional data processing overhead.

In a further approach for optimizing the toll system, upon repeated determination of vehicle positions exclusively within the monitoring zone and outside the detection zone, the detection zone is adjusted in the electronic image of the road network. In this case the adjustment can consist in a slight displacement, a different geometric shape, or a slight enlargement of the detection zone.

In a further embodiment the position determining unit makes use of the signals of a satellite navigation system.

BRIEF DESCRIPTION OF THE DRAWINGS

The invention is explained in more detail below with reference to the accompanying drawings, in which.

DETAILED DESCRIPTION OF INVENTION

Figure 1:
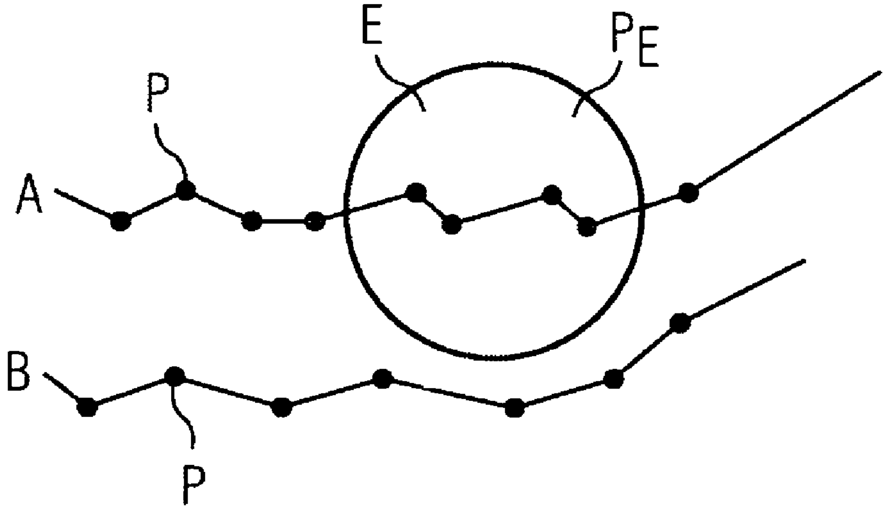
FIG. 1 shows a schematic representation of a detection zone in the electronic image of a road network, as well as entered position data of a vehicle for two road sections A and B.

FIG. 1 shows in schematic form a detection zone E as specified in the electronic image of a road network. In the example shown, the detection zone E is defined by means of a circle, though other geometric shapes such as, say, tubular figures or closed polylines can be used. The object of the detection zones is to simulate the course of tollable road sections of the road network as accurately as possible.

Also depicted in FIG. 1 in addition is position data P, as determined by the position determining units disposed in vehicles. In this case FIG. 1 shows a first road section A which leads through the detection zone E. For said road section A it is determined in a known manner that with reference to the position data $P_E$ the vehicle is situated within a tollable zone. The position data $P_E$ is buffered by the position determining unit of the vehicle until the vehicle leaves the detection zone E. After the vehicle leaves the detection zone E, all toll-related information is determined on the basis of the position data $P_E$ lying within the detection zone E, preferably by the position determining unit, and sent in edited form to a central management unit. The management unit then assumes all further steps required for billing to the corresponding toll user.

The detection zones E are defined in the course of the configuration of the toll system. As mentioned already, it can happen during practical operation of the toll system that a vehicle travels a tollable road without being detected by the toll system, since the corresponding detection zone E is not optimally defined. This case is indicated in FIG. 1 by means of the road section B. In the case of the road section B, although the corresponding vehicle is moving along a tollable road, this tollable journey is not detected by the position determining unit due to a suboptimal choice of the detection zone E. These cases are often not recognizable initially during the configuration of the toll system, since the precision of the transfer of the vehicle position into the electronic image of the road network is subject to limits due to factors which often only come to light as a result of practical experience. The journey along the road section B is therefore not detected by the mobile position determining unit of the vehicle, and consequently no toll-related data is transmitted to the management unit either.

Figure 2:
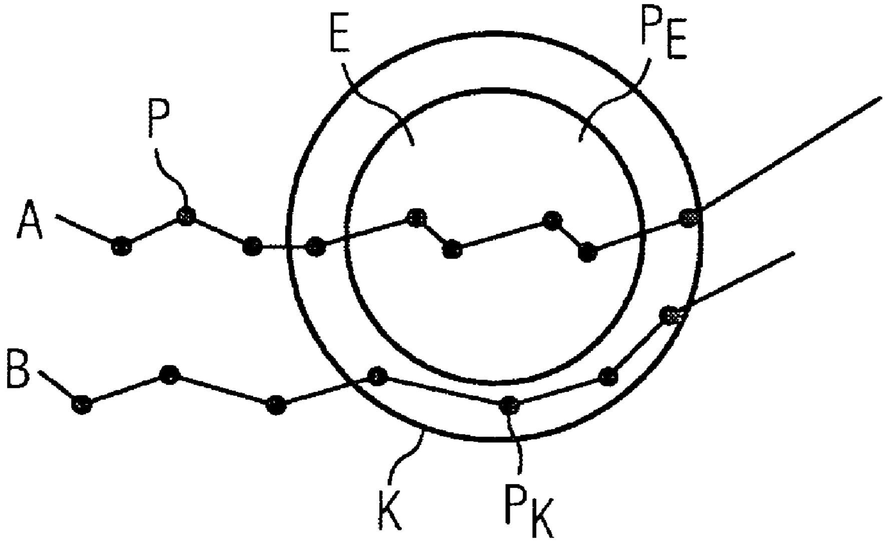
FIG. 2 shows the detection zone of FIG. 1, wherein it is overlaid by a monitoring zone according to the invention.

It is therefore provided according to the invention to provide the detection zone E with an additional monitoring zone K which in its spatial extension extends beyond the detection zone E, as is illustrated in FIG. 2. FIG. 2 shows a monitoring zone K which is implemented more or less as a concentric circle around the circular detection zone E, but it could also have other shapes. The position determining unit now checks not only whether the determined position data P falls within the detection zone E, but also whether it lies within the monitoring zone K. If the position data P lies within both the detection zone E and the monitoring zone K, in other words, referring to FIG. 2, it is the position data $P_E$ according to the road section A, then the position data $P_E$ lying within the detection zone E is processed further and in subsequent steps toll-related data is sent to the management unit. In this case the position data $P_E$ is processed and the edited, toll-related data sent to the management unit in a conventional manner.

For the road section B, on the other hand, the position determining unit detects that the position data $P_K$, though lying within the monitoring zone K, does not fall within the detection zone E. In these cases there is the suspicion that the respective vehicle has made a journey that is subject to payment of a toll, but this has not been detected due to a suboptimal choice of the detection zone E. In these cases the position data $P_K$ lying within the monitoring zone K is sent to the central management unit, where a check of the data is carried out. If vehicle positions are repeatedly determined within the monitoring zone K and outside the detection zone E, an adjustment of the detection zone E can be made in the electronic image of the road network, said adjustment being transmitted to the mobile position determining units in the form, say, of a corresponding software update.

By this means the detecting of tollable vehicles can be optimized, in particular a test method being provided by means of which non-detected journeys can also be subjected to a retrospective check, but without substantially increasing the volume of data in the process.

The invention claimed is:

1. A test method for optimizing a toll collection obligation for vehicles on toll roads of a road network, comprising:
- providing a vehicle-mounted position determining unit;
- providing a vehicle-external management unit connected to the vehicle-mounted position determining unit for data communication;
- detecting vehicles on the toll roads subject to a toll collection obligation by:
  - overlaying the toll roads of the road network in an electronic image of the road network by detection zones having a predefined coverage area;
  - determining by the vehicle-mounted position determining unit toll-related data based upon position data lying within the detection zone of the vehicle-mounted position determining unit;
  - sending the toll-related data from the vehicle-mounted position determining unit to the management unit;
- detecting vehicles on the toll roads but not detected in the detection zones by:
  - providing monitoring zones in the electronic image of the road network, wherein the monitoring zones are assigned to detection zones, wherein the monitoring zones extend in their spatial extension beyond the predefined coverage area of the detection zone;
  - determining by the vehicle-mounted position determining unit journeys exclusively within the monitoring zone and outside the detection zone, wherein the position determining unit sends the position data of the journeys to the management unit;
  - checking the position data of the journeys exclusively within the monitoring zone and outside the detection zone by the management unit; and
  - determining that the journeys should also be subject to the toll collection obligation.

2. The test method as claimed in claim 1, wherein the predefined coverage area of the detection zone in the electronic image of the road network is adjusted based upon the data sent by the position determining unit to include the journeys detected exclusively within the monitoring zone and outside the detection zone.

3. The test method as claimed in claim 1, wherein the position determining unit, upon determining journeys with vehicle positions within the monitoring zone as well as within the detection zone, deletes the vehicle position data lying within the monitoring zone and outside the detection zone.

4. The test method as claimed in claim 2, wherein the position determining unit, upon determining journeys with vehicle positions within the monitoring zone as well as within the detection zone, deletes the vehicle position data lying within the monitoring zone and outside the detection zone.

5. The test method as claimed in claim 1, wherein if journeys with vehicle positions within the monitoring zone and outside the detection zone are determined repeatedly, an adjustment of the detection zone is carried out in the electronic image of the road network.

6. The test method as claimed in claim 2, wherein if journeys with vehicle positions within the monitoring zone and outside the detection zone are determined repeatedly, an adjustment of the detection zone is carried out in the electronic image of the road network.

7. The test method as claimed in claim 3, wherein if journeys with vehicle positions within the monitoring zone and outside the detection zone are determined repeatedly, an adjustment of the detection zone is carried out in the electronic image of the road network.

8. The test method as claimed in claim 4, wherein if journeys with vehicle positions within the monitoring zone and outside the detection zone are determined repeatedly, an adjustment of the detection zone is carried out in the electronic image of the road network.

9. The test method as claimed in claim 1, wherein the position determining unit makes use of signals of a satellite navigation system.

10. The test method as claimed in claim 2, wherein the position determining unit makes use of signals of a satellite navigation system.

11. The test method as claimed in claim 3, wherein the position determining unit makes use of signals of a satellite navigation system.

12. The test method as claimed in claim 4, wherein the position determining unit makes use of signals of a satellite navigation system.

13. The test method as claimed in claim 5, wherein the position determining unit makes use of signals of a satellite navigation system.

14. The test method as claimed in claim 6, wherein the position determining unit makes use of signals of a satellite navigation system.

15. The test method as claimed in claim 7, wherein the position determining unit makes use of signals of a satellite navigation system.

16. The test method as claimed in claim 8, wherein the position determining unit makes use of signals of a satellite navigation system.

* * * * *